UNITED STATES PATENT OFFICE.

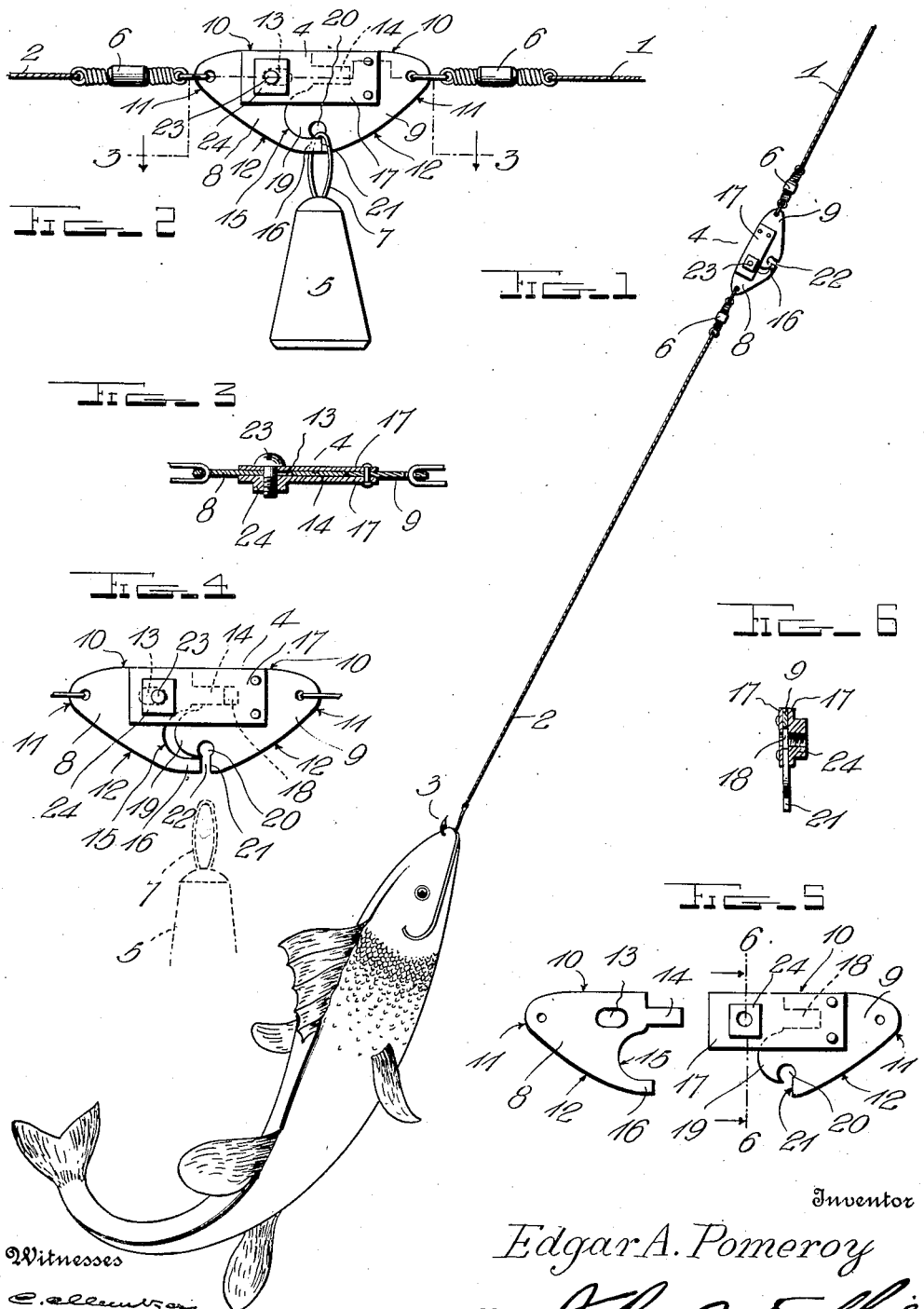

EDGAR A. POMEROY, OF SAN JOSE, CALIFORNIA.

SINKER-SUPPORT.

1,033,464.   Specification of Letters Patent.   Patented July 23, 1912.

Application filed January 15, 1912. Serial No. 671,173.

*To all whom it may concern:*

Be it known that I, EDGAR A. POMEROY, a citizen of the United States, residing at San Jose, in the county of Santa Clara and State of California, have invented certain new and useful Improvements in Sinker-Supports, of which the following is a specification.

This invention relates to a sinker support and has for its primary object to provide a support of this character whereby the sinker may be detached or released when trolling to enable a sportsman who is fond of the sport of fishing to use a light rod and have the pleasure of playing the fish without the weight and encumbrance of a sinker.

With the foregoing and other objects in view which will appear as the nature of the invention is better understood, the invention consists in the novel features of construction illustrated in the drawings and more particularly pointed out in the appended claims.

In the accompanying drawings:—Figure 1 is a view illustrating the application of the device, a fish on the line and the sinker detached. Fig. 2 is a front elevation of the sinker support and its connections on an enlarged scale, the sinker in position. Fig. 3 is a horizontal section, taken on line 3—3 of Fig. 2. Fig. 4 is a side elevation of the support with the two coöperating parts in releasing position. Fig. 5 is a similar view, with the parts disconnected, and Fig. 6 is a vertical transverse section taken on the plane indicated by the dotted lines 6—6 of Fig. 5, looking in the direction indicated by the arrows.

Referring to the drawings for a more particular description of the invention, 1 indicates the line from the fishing rod, or what may be termed the hand line, 2 the line or snood to which is attached the hook 3, 4 the sinker support disposed between the lines 1 and 2 and 5 the sinker. The lines 1 and 2 are connected with opposite ends of the sinker support, as shown, by the swivels 6, or other equivalent means. The sinker 5, which may be composed of iron, lead or other material is connected with the support 4 by the loop 7, of copper wire or string.

The sinker support, which constitutes the invention, consists of a pair of flat metal sections 8 and 9, respectively, formed preferably with straight upper edges, rounded or beveled corners 11 and convex bottom edges 12. It is obvious, however, that the sections may be of any other suitable design or configuration, as preferred.

The section 8 of the support is provided in its body at a point near its upper edge and inner end with a longitudinal elongated slot 13 and has projecting longitudinally from its inner edge, a tongue or extension 14, which is disposed in alinement with the slot. The section 8 of the support is further provided in its inner edge at a point beneath the tongue and slot, with a concave recess 15, leaving the extension 16. The other section 9 of the sinker support has riveted or otherwise attached to opposite sides, a pair of flat rectangular laterally spaced clamping or friction plates 17, the inner ends of which project somewhat beyond the inner end of said section, as indicated. Said section 9 is further provided, in its inner end, with a longitudinal socket 18, adapted to receive the tongue 14 of section 8 when the parts are in connected relation. A hook shaped lug 19 is formed at the inner end of section 9, leaving an eye 20 for the reception of the attaching loop 7 of the sinker. The clamping plates 17 are of a width of approximately half the greater width of the support sections, and are preferably arranged with their upper edges flush with those of section 9.

When the two sections of the support are in sinker supporting position, the convex edge of the lug 19 of section 9 engages the recess 15 of section 8, under which conditions the end of extension 16 and edge 21 of section 9 abut with the point of the lug spaced slightly from the outer end of the extension, which serves as a support for the loop of the sinker, with the result that the latter is connected with the sinker support. When a sharp pull is exerted on the line 2, however, as when a "catch" is made, the section 9 of the support is slid to its other extreme or releasing position, as indicated in Figs. 1 and 4, which brings the point of the hook shaped lug 19 in line with the outer end of extension 16, which releases the sinker by reason of the loop slipping through the space 22.

The amount of pull or tension on the line 2 necessary to slide the section 9 of the support into releasing position to release the sinker is governed by the pressure of the clamping or friction plates 17 on opposite side faces of section 8. This pressure may be varied by the screw and nut 23 and 24, respectively, the former of which passes through the outer ends of the clamping plates and the elongated slot 13 and the latter of which is cast with or soldered to one of the clamping plates. It is obvious, however, that as far as the nut is concerned, it may be made separable and screw on the screw 23.

From the foregoing description taken in connection with the drawings, it is thought that the construction, operation and many advantages of my device will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new, is:—

1. A sinker support of the character specified, comprising a pair of flat metal relatively stationary and movable sections, means formed on the sections to receive and support the loop of a sinker when the sections are contracted and to release the sinker when said sections are in expanded or releasing position, means for connecting opposite ends of the support to the rod line and hook line, respectively, a pair of clamping plates secured to the stationary section of the support and engaging opposite faces of the movable section to resist sliding movement of the latter and adjustable means to regulate the pressure of the plates on the movable section.

2. A sinker support of the character specified, comprising a pair of relatively movable and stationary sections, the former provided at one end with a longitudinal tongue, in said end at a point beneath the tongue with a concave recess, leaving an extension, and in its body with a longitudinal elongated slot disposed in alinement with the tongue, and the latter provided in its inner end with a longitudinal socket to receive the tongue, and a hook shaped lug adapted to engage the wall of the recess when the sections are contracted, a pair of clamping plates secured at their outer ends to the stationary section and bearing against opposite side faces of the movable section, said plates adapted to resist the expansion or separation of the sections, means including a screw passing through the slot of the movable section for adjusting the pressure of the clamping plates on the movable section, the point of the hook shaped lug of the stationary section adapted to position in line with the outer end of the extension of the movable section when the sections are expanded to provide for the reception or release of the bail of a sinker and being spaced inwardly from the outer end of the extension when the parts are contracted to provide for the attachment of the bail to the support.

In testimony whereof I affix my signature in presence of two witnesses.

EDGAR A. POMEROY.

Witnesses:
HOWARD W. COWELL,
L. P. EDWARDS.